Patented Sept. 8, 1931

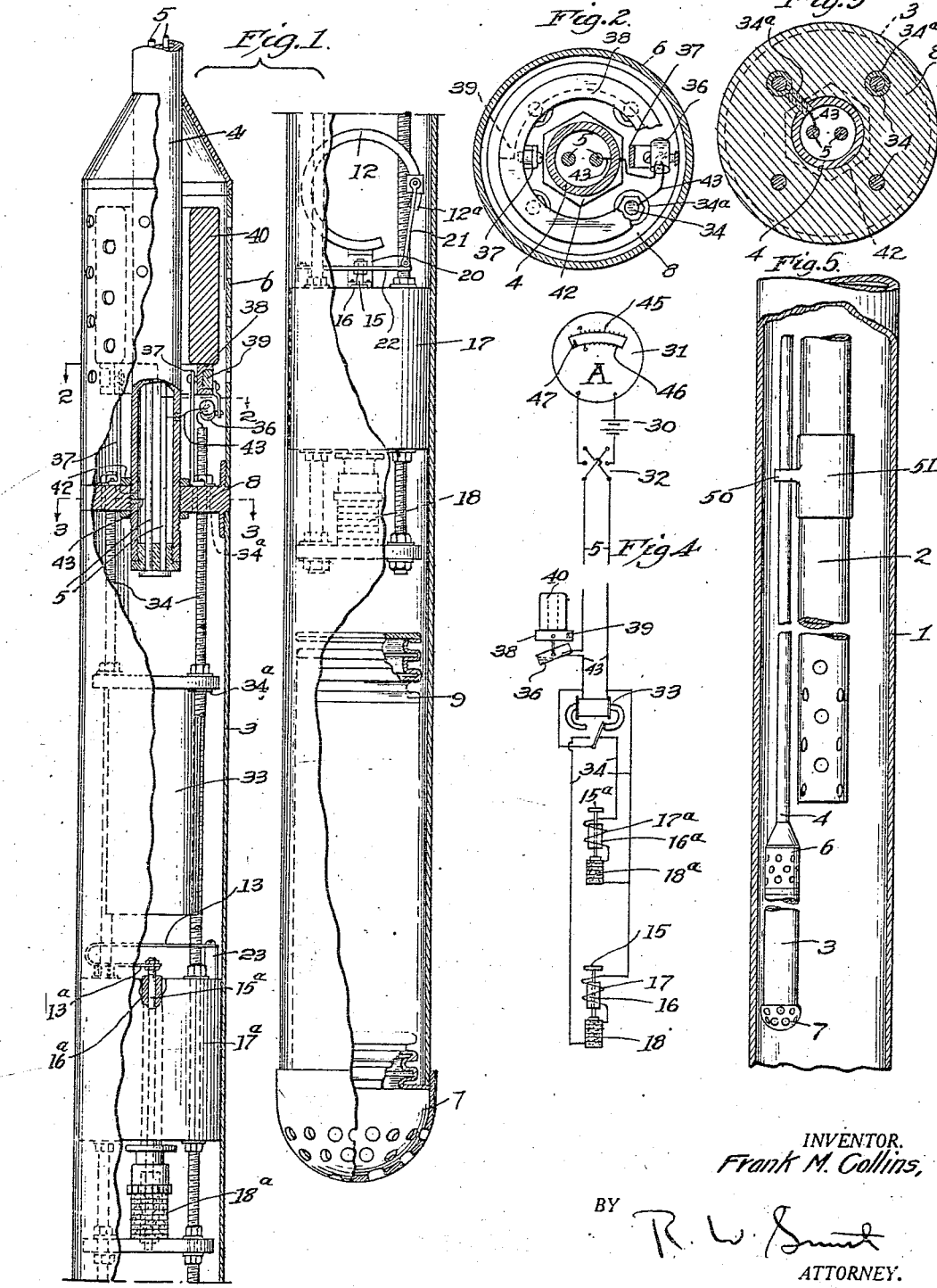

1,822,203

UNITED STATES PATENT OFFICE

FRANK M. COLLINS, OF FULLERTON, CALIFORNIA

INDICATING MEANS FOR WELLS

Application filed September 26, 1928. Serial No. 308,563.

This invention is an improvement upon the pressure measuring means described in my co-pending application Ser. No. 281,742, filed May 31, 1928, and has for its object to not only measure pressure but also indicate the temperature and the fluid level in a well or the like.

More particularly it is an object of the invention to provide a mechanism adapted to be lowered in a well or other body of liquid and comprising pressure and temperature responsive media, preferably adapted for selective connection to a suitable indicator which may be positioned at the surface of the earth for indicating either pressure or temperature at the various levels to which the mechanism may be lowered.

It is a still further object of the invention to incorporate in the mechanism which is lowered into the well a suitable means movable responsive to its submergence in the liquid for indicating the liquid level in the well, and to preferably adapt said liquid level responsive medium for registry upon the same indicator which is adapted to selectively indicate either pressure or temperature.

It is a still further object of the invention to provide an electrically actuated indicator, the circuit through which is completed by submergence of the liquid responsive medium so as to indicate the liquid level by initial movement of the indicator, and which indicator is then adapted for selective movement in accordance with either pressure or temperature, so that by reading corresponding graduations either pressure or temperature in the well may be accurately measured.

It is a still further object of the invention to provide a mechanism of compact and sturdy construction permitting of its being readily lowered in a well, and adapted for accurate operation irrespective of variations in voltage or in circuit resistance, so as to definitely indicate the liquid level, and selectively measure either the pressure or temperature at the different levels in a well.

Further objects of the invention will be readily understood from the following description of the accompanying drawings, in which:

Fig. 1 is a side elevation, partly in axial section, of the mechanism which is lowered into the well.

Figs. 2 and 3 are transverse sections on the lines 2—2 and 3—3 of Fig. 1.

Fig. 4 is a wiring diagram of the invention.

Fig. 5 is a fragmentary axial section through well casing, showing one method of lowering the mechanism into a well.

The invention is adapted for use in connection with any well, shown in Fig. 5 as provided with usual well casing 1 adapted to receive well tubing 2; and a housing 3 for the operating mechanism of the indicator may be lowered in the well and then withdrawn prior to running the tubing, or it may be lowered with the tubing and remain in the well during production as is indicated in Fig. 5. The housing 3 is suspended from a suitable cable 4, which preferably carries electrical conductors 5 for the electrical circuit of the apparatus; and the cable may be raised and lowered by any usual drum forming a part of the derrick rig (not shown), and which provides for measuring in any usual manner the length of cable which has been unwound so as to indicate the level to which housing 3 has been lowered in the well, and which also provides in any usual manner (not shown), for connecting the conductors 5 to suitable electrical apparatus at the surface of the earth without interfering with the hoisting and lowering of the cable.

The housing 3 carries mechanism actuated responsive to temperature variations, together with mechanism regulated by changes in pressure, and preferably also contains apparatus operated by its submergence in a liquid. The pressure and temperature responsive media are preferably mounted in a part of the housing containing a liquid and arranged whereby said liquid will assume substantially the same temperature and pressure as that in the well at the level to which the housing has been lowered, and the apparatus which is operated by its submergence in liquid is preferably mounted in a head 6 forming a part of housing 3 and open to the well bore so that when the housing has been lowered to the level of the liquid in a well the liquid will enter the head 6 and submerge the said apparatus.

As an instance of this arrangement the housing 3 is shown as an elongated cylindrical casing having a perforated shoe 7 at its lower end; and preferably connected at its upper end to a perforated cylindrical extension forming the head 6, by means of a coupling 8 forming a transverse partition between the main casing and its head. The main casing is preferably filled with the same liquid as is in the well bore in which the indicator is to be used, and is then preferably hermetically sealed, with an expansible member 9 communicating with the perforated shoe 7 and extending into the main casing, so that the liquid in the well entering the perforated shoe and the expansible member 9 will cause substantially the same pressure in the main casing as in the surrounding bore. In similar manner heat radiation through the wall of casing 3 will cause the liquid in the main casing to assume substantially the same temperature as in the surrounding well bore, and expansion of the liquid in the main casing as a result of a rise in temperature is balanced by the expansible member 9 so as to maintain the same pressure in the main casing as in the surrounding well bore.

The pressure and temperature responsive media in main casing 3, includes respectively a pressure responsive element such as an evacuated Bourdon tube 12, and a temperature responsive element such as a bimetallic strip 13; and the devices actuated by the tube 12 and strip 13 respectively, may be of similar construction and cooperate with a suitable indicating means which is preferably positioned at the surface of the earth. In the present instance these actuating devices are electrical apparatus adapted to operate an indicating means shown as an amperage responsive device, and include spindles 15—15ª carrying the cores 16—16ª of solenoids 17—17ª. The spindles at one end abut against carbon piles 18—18ª, connected in series with the corresponding solenoids 17—17ª and with a source of electrical energy and an amperage responsive device, and the pressure of tube 12 and strip 13 is exerted against the opposite end of the respective spindles, thereby automatically tending to balance the current in the respective circuits, since increase in pressure upon a spindle will correspondingly compress its cooperating carbon pile and thus increase the current through the cooperating solenoid so as to oppose said increase in pressure, and as a consequence variations in voltage or circuit resistance have no effect upon the current in the respective circuits, which will thus vary for actuating the corresponding amperage responsive device, strictly in accordance with variations in the pressure of tube 12 and strip 13 respectively.

The tube 12 may be mounted upon solenoid 17 by means of a bracket 20, with the end 12ª of the tube adapted to curl responsive to the pressure in main casing 3, and preferably connected by lever 21 to a leaf spring 22 which in turn engages the spindle 15 so that pressure responsive curling of the Bourdon tube will exert a corresponding pressure against the spindle. In similar manner the bimetallic strip 13 exerts pressure against spindle 15ª in accordance with the temperature in main casing 3, the bimetallic strip being shown as mounted upon a bracket 23 on solenoid 17ª, with its end 13ª connected to spindle 15ª and so bent that it tends to swing in a direction exerting increased pressure on the spindle in accordance with a rise in temperature.

The current through the circuits containing the current balancing devices is thus proportional to pressure and temperature respectively, for correspondingly actuating a cooperating amperage responsive device, and in practice the two circuits may be supplied from a common source of electrical energy denoted at 30, and may also include a common amperage responsive device indicated at 31, with a reversing switch 32 and a polarized relay 33 providing for selective actuation of the amperage responsive device by either the pressure or the temperature responsive means.

As an instance of this arrangement the polarized relay 33 may be mounted in casing 3, and said relay and the two current balancing devices may have a common support comprising elongated bolts 34 suspended from transverse partition 8 and extending through the casings for the polarized relay and the solenoids 71—17ª. Certain of these bolts are preferably insulated as shown at 34ª and form the conductors for the electric circuit.

This circuit is normally open, and is adapted to be closed by submergence of casing 3 in the liquid in a well, so that initial actuation of the amperage responsive device 31 will indicate that the liquid level has been reached, and subsequent further movement of the amperage responsive device will then selectively indicate either the pressure or temperature of the liquid depending upon the position of reversing switch 32. For this purpose a switch 36 is provided in the electric circuit and is preferably mounted in head 6, and is normally held open by the submergence responsive apparatus which is mounted in said head, but is adapted to close upon movement of said apparatus responsive to its submergence in the liquid which will enter the perforated head 6 as soon as casing 3 is lowered to the liquid level in the well.

As an instance of this arrangement brackets 37 projecting upwardly from transverse partition 8 pivotally support an annulus 38 which is weighted as shown at 39 so as to tend to tilt relative to its pivotal mounting. Switch 36 is shown as a mercury switch suspended from annulus 38 so as to break the circuit as long as the annulus remains in its normal non-tilted position shown in Fig. 1, but adapted to close the circuit when the annulus is tilted; and the annulus is normally retained in non-tilted position by an annular float 40 resting thereon, with the float adapted to rise in head 6 and thus release the annulus for tilting so as to close switch 36, whenever liquid enters the perforated head 6 as a result of the casing 3 being lowered to the liquid level in a well. The switch 36 and the insulated conductor bolts 34$^a$ are arranged in circuit with the conductors 5 in cable 4, which lead to the source of energy 30 and to the reversing switch 32 and the amperage responsive device 31, which are preferably positioned at the surface of the earth for convenient access thereto; and as an instance of this arrangement the cable 4 may extend into head 6 and be suitably secured to transverse partition 8 as shown at 42, with the conductors 5 electrically connected to conductors 34 and to switch 36 by insulated conductors 43.

The amperage responsive movable device 31 may be any suitable indicator forming either simply a register, or a recorder producing a permanent record, and in the present instance is shown as simply a register comprising a usual ammeter calibrated at graduations 45—46 for pressure and temperature respectively, with the zeros of said graduations preferably spaced from the absolute zero which the pointer 47 will assume when the circuit is broken, a distance equal to the movement of said pointer responsive to the initial amperage resulting from closing the circuit and before pressure on either spindle 15 or 15$^a$ has affected an increase in the current.

By this arrangement, initial movement of pointer 47 from absolute zero to the zero of graduations 45—46, will indicate closing of the electric circuit as a result of the rise of float 40, and will thus indicate that casing 3 has been lowered to the liquid level in a well; and subsequent readings upon either graduations 45 or 46 selected in accordance with the position of reversing switch 32, will indicate either the pressure or the temperature in the well.

In operation, with switch 32 positioned to selectively include in the circuit either the pressure or the temperature responsive mechanism, the casing 3 is lowered in a well by means of cable 4, and without being affected by mere foam in the well, the float 40 rises and thus permits closing of switch 36 as soon as the liquid level is reached. This is indicated by pointer 47 moving from absolute zero to the zero graduations, and the length of cable 4 which has been paid out up to this point thus indicates the liquid level in the well. The casing 3 is then lowered through the liquid in the well, and readings are taken at predetermined levels indicated by specified additional lengths of the cable having been unwound, with these readings taken on either the pressure graduations 46 or on the temperature graduations 47, depending upon the data to be ascertained as determined by the selective positioning of reversing switch 32. When the bottom of the bore is reached, switch 32 is reversed so as to change from pressure to temperature readings or vice versa, and during subsequent withdrawal of casing 3 readings are taken on the corresponding graduations 45 or 46 at predetermined levels indicated by the length of cable 4.

Such operation presupposes a running in and withdrawal of the indicator mechanism, although it may be run in with tubing 2 as shown in Fig. 5, with cable 4 preferably extending through suitable guides 50 which may be formed on the tubing couplings 51, and then left in the bore with casing 3 preferably suspended below the end of the tubing during production. In this case the liquid level is indicated as previously described, and during lowering of the tubing 2 and casing 3 through the liquid in the well, the switch 32 is preferably positioned for pressure readings on ammeter 31, and is only reversed momentarily for temperature readings whenever desired, but preferably only at appreciable intervals of depth since temperature is not subject to sudden changes. When the tubing is in position so that casing 3 remains at the same level in the well, switch 32 is preferably left in position for pressure readings, and any further indicated changes in pressure will thus denote a change in the liquid level in the well, and by noting the pressure for the indicated liquid level at the start of production, any subsequent change in the liquid level may be readily measured by computations based upon an indicated change in pressure.

I have thus provided extremely simple and compact but reliable and efficient means for ascertaining complete data relative to the liquid level and the pressure and temperature at various levels in a well, and I have also provided for readily measuring any change in the liquid level in a well while it is on production.

While the invention has been described with particular reference to its use in connection with oil wells, it will be readily apparent that it is applicable to other types of wells or in fact any body of fluid concerning which pressure, temperature and liquid level data is desired. Thus for example the casing 3 may be lowered into a natural body of water for ascertaining pressure and temperature at different levels when making ocean soundings and the like, and it will therefore be understood that reference to wells in the appended claims is to be construed as a generic designation for any body of fluid.

I claim:

1. In combination, an electric circuit including an indicator movable responsive to electric current variations, a support adapted to be lowered relative to said indicator to determined depths in a body of liquid, the electric circuit extending to the support, an electric resistance element in the electric circuit and carried by the support, variable actuating means carried by the support, means cooperating with the variable actuating means for varying the resistance element to vary electric current passing through said resistance element in accordance with movement of the variable actuating means, a normally open switch in the electric circuit, and means carried by the support for closing said switch responsive to submergence of said switch closing means in the body of liquid.

2. In combination, an electric circuit including an indicator movable responsive to electric current variations, a closed container adapted to be lowered relative to said indicator to determined depths in a body of liquid, the electric circuit extending to the closed container, an expansible device in said container and communicating with the interior thereof for balancing the pressure inside and outside the container, an electric resistance element in the electric circuit and mounted in the closed container, a member in the closed container movable in accordance with pressure variations, means cooperating with said member for varying the resistance element to vary electric current passing through said resistance element in accordance with movement of the member, a normally open switch in the electric circuit, and means carried by the closed container for closing said switch responsive to submergence of said switch closing means in the body of liquid.

In testimony whereof he has affixed his signature.

FRANK M. COLLINS.